(12) United States Patent
Majcen et al.

(10) Patent No.: US 9,260,150 B2
(45) Date of Patent: Feb. 16, 2016

(54) DETACHABLE FOOT REST

(76) Inventors: Marjan Majcen, South Orange, NJ (US); Martin Vehovar, Bresternica (SI)

( * ) Notice: Subject to any disclaimer, the term of this patent is extended or adjusted under 35 U.S.C. 154(b) by 0 days.

(21) Appl. No.: 13/095,754

(22) Filed: Apr. 27, 2011

(65) Prior Publication Data
US 2012/0274044 A1 Nov. 1, 2012

(51) Int. Cl.
*B62J 25/00* (2006.01)

(52) U.S. Cl.
CPC ...................................... *B62J 25/00* (2013.01)

(58) Field of Classification Search
USPC .............. 280/291; 74/564; 180/218, 219, 220
See application file for complete search history.

(56) References Cited

U.S. PATENT DOCUMENTS

| | | | | |
|---|---|---|---|---|
| 4,591,179 | A * | 5/1986 | Nakamura | 280/291 |
| 4,852,900 | A * | 8/1989 | Nahachewski | 280/291 |
| 6,390,488 | B1 * | 5/2002 | Wallingsford | 280/291 |
| 7,802,806 | B2 * | 9/2010 | Danze | 280/291 |
| 2007/0289404 | A1 * | 12/2007 | Smith | 74/564 |

* cited by examiner

*Primary Examiner* — Tony Winner
(74) *Attorney, Agent, or Firm* — Wilson Daniel Swayze, Jr.

(57) ABSTRACT

A detachable foot rest for a motorcycle to detachably connect to a permanently connected foot rest may include a first mirror side member, a center member connected to the first mirror side member and a second mirror side member connected to the center member. The first mirror side member may include a first depression, and the second mirror side member may include a mirror first depression. The first depression and the mirror first depression may cooperate with a leading section of the permanently connected foot rest.

3 Claims, 6 Drawing Sheets

DETACHABLE FOOT REST

FIELD OF THE INVENTION

Background

Motorcycles are a favorite vehicle for many individuals throughout the world today. Most of these motorcycles may be designed to carry at least one passenger, and many are designed to carry a second passenger, usually behind the first passenger.

A subset of these motorcycles may be known as dirt bikes which are generally lightweight bikes which have optional equipment removed in order to achieve faster speeds. These dirt bikes generally do not have accommodations for a second passenger. This aspect is generally inconvenient because there are times where it is desirable to accommodate the second passenger on the dirt bike.

SUMMARY

A detachable foot rest for a motorcycle to detachably connect to a permanently connected foot rest may include a first mirror side member, a center member connected to the first mirror side member and a second mirror side member connected to the center member. The first mirror side member may include a first depression, and the second mirror side member may include a mirror first depression. The first depression and the mirror first depression may cooperate with a leading section of the permanently connected foot rest.

The first mirror side member may include a second depression and the second mirror side member may include a mirrored second depression and the center member may include a third depression.

The second depression, the mirror second depression and the third depression may be opposed to the first depression and the first mirror depression and may engage a trailing section of the permanently connected foot rest.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

The present invention addresses the needs of a dirt bike operator and accommodates at least partially, the ability for a second passenger to ride a dirt bike. One problem with all motorcycles with is a need for a foot rest for both the first and second passenger. The foot rest tends to keep the foot of the first and second passenger from interfering with the operation of the motorcycle.

Figure 6:
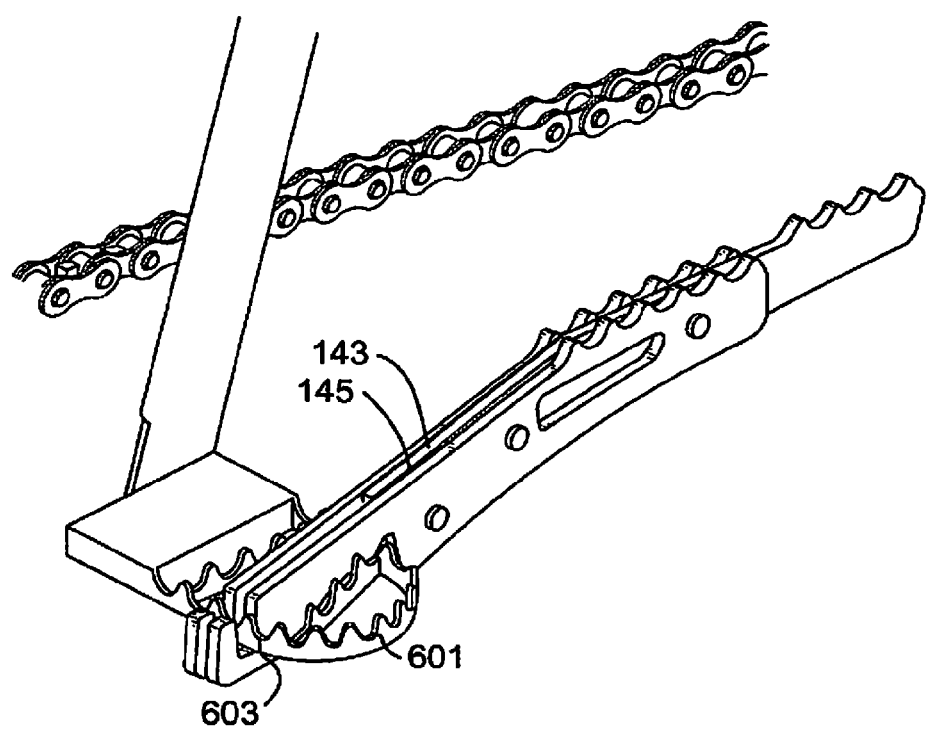
FIG. 6 illustrates a perspective view of the first mirror side member, the center member, the second mirror side member and the permanently attached foot rest.

The detachable foot rest 100 of the present invention may be detachable, and elongated from the dirtbike and more particularly, the detachable foot rest 100 of the present invention may be detachable from the original permanently mounted foot rest 161 (as shown in FIG. 6) of the dirtbike. Consequently, the detachable foot rest 100 may be used by the second passenger, and the detachable foot rest 100 may be removed so that the dirtbike may be employed in a race. The detachable foot rest 100 may be reinstalled on the dirtbike for use by the second passenger.

Figure 1:
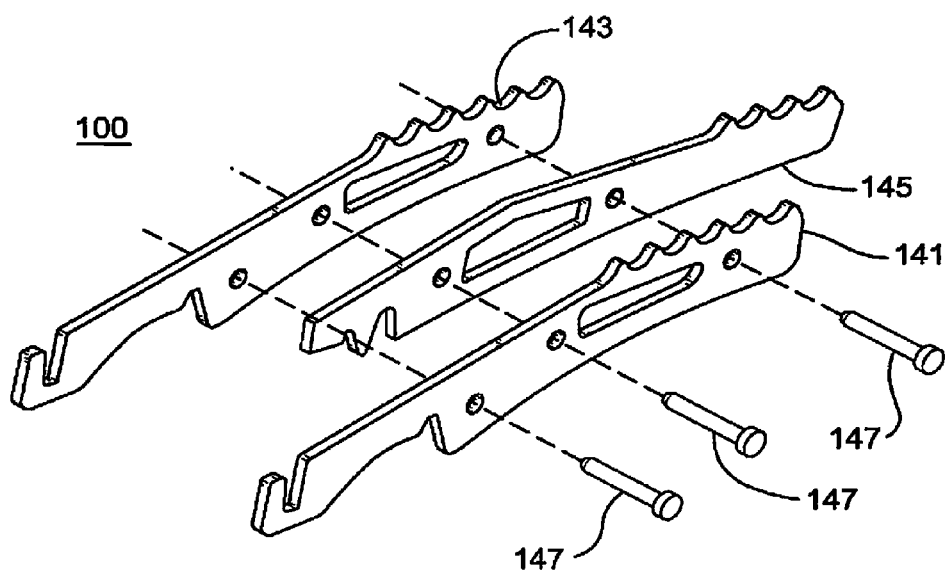
FIG. 1 illustrates an exploded view of the detachable foot rest against the of the present invention.

FIG. 1 illustrates an exploded view of the detachable foot rest 100 of the present invention, and the detachable foot rest 100 may include a first mirrored side member 141, a second mirror side member 143 which may be a mirror of the first mirror side member 141 by having substantially all the elements of the first mirror side member 141 and a center member 145. The first mirror side member 141 may be connected to the center member 145 which may be connected to the second mirror side member 143. The first mirror side member 141, the center member 145 and the second mirror side member 143 may be connected and fastened together by a fastener device 147 which may be a bolt having male threaded end to cooperate with the second aperture 109 of the first mirror side member 141 and the second mirror side member 143 which may have female threads to cooperate with the male threads of the fastener device 147.

Figure 2:
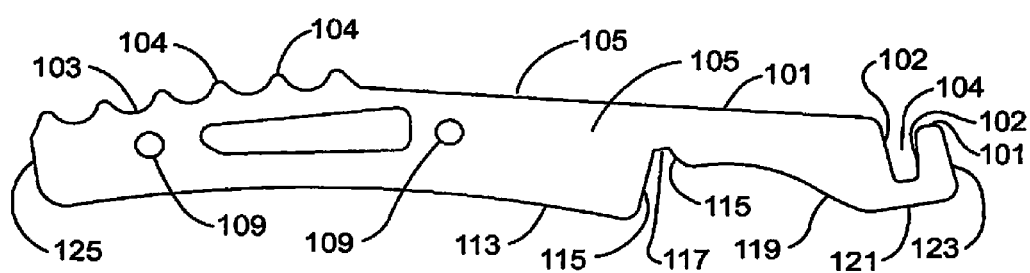
FIG. 2 illustrates a side view of the first mirror side member or alternatively of the second mirror side member of the present invention.

FIG. 2 illustrates a side view of the first mirror side member 141 or the second mirror side member 143 which may be a mirror image of the first mirror side member 141. The first mirror side member 141 or the second mirror side member 143 may be formed from rigid material such as metal, wood, plastic or other appropriate material. The first mirror side member 141 may include a first inclined top surface 101 which may be connected to a pair of opposing side surfaces 105 which may be substantially planar, and the first inclined top surface 101 may be connected to a second inclined top surface 103 which may be connected to the pair of opposing side surfaces 105. The first inclined top surface 101 may be angled at an acute angle with respect to the second inclined top surface 103 in order to provide a substantially horizontal surface to rest a foot of the user. The first inclined top surface 101 may include teeth 154 which may extend upwards in order to provide additional friction with the shoe of the user.

The side surface 105 may define a first aperture 107 in order to reduce the weight requirements of the detachable foot rest 100. In addition, the side surface 105 may include a pair of second apertures 109 which may be placed in a spaced relationship to each other and which may include female threads in order to cooperate with the male threads of the fastener device 147 (not shown in FIG. 2)

FIG. 2 additionally illustrates a first end surface 123 to connect the second inclined top surface 103 to the planar bottom surface 121 and a second end surface 125 to connect the first inclined top surface 101 to the first concave bottom surface 113.

The first concave bottom surface 113 which may be concave may be connected to a curved bottom surface 115 which may define a depression 117 and which may be connected to a second concave bottom surface 119 which may be concave shaped. The second concave bottom surface 119 may be connected to the planar bottom surface 121.

The first inclined top surface 101 may be connected to a curved top surface 102 which may define a top depression 104.

Figure 3:
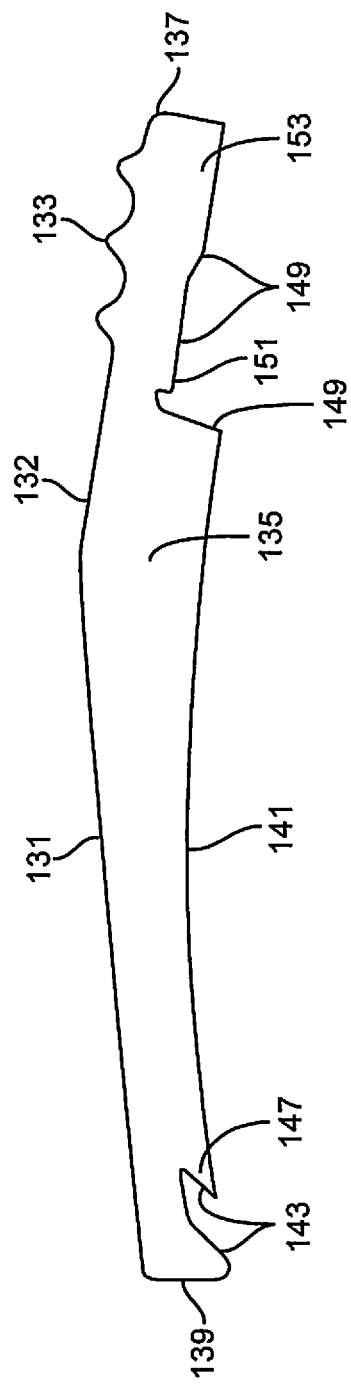
FIG. 3 illustrates a side view of the center member of the present invention.

FIG. 3 illustrates a side view of the center member 145 of the detachable foot rest 100 and illustrates a third inclined top surface 131 which may include teeth 133 positioned on an end of the third inclined top surface 131. The center member 145 may be rigid and formed from material such as metal, wood, plastic or other appropriate material. The center member 145 may include a fourth inclined top surface 132 which may be connected to the third inclined top surface 131 at an acute angle, and the fourth inclined top surface 132 may include teeth 133 on an end of the fourth inclined top surface 132.

The opposing side surfaces 135 may be connected to a concave bottom surface 141 which may be connected to a first curved bottom surface 143 which may define a first depression and may form a hook surface 147 to grasp the foot rest of the mounted foot rest of the dirtbike.

FIG. 3 additionally illustrates the concave bottom surface 141 being connected to a second curved bottom surface 149 which may be connected to the side surface 135 and which may define a depression 151 to engage the permanent foot rest of the dirtbike 161. The second curved bottom surface 141 may be connected to a third bottom surface 153 which may be connected to the first end surface 131.

The third concave curved top surface 131 may be connected to a pair of opposing side surfaces 135 which may be substantially planar and the third concave curved top surface 131 may be connected to a first end surface 137 and may be connected to a second end surface 139.

Figure 4:
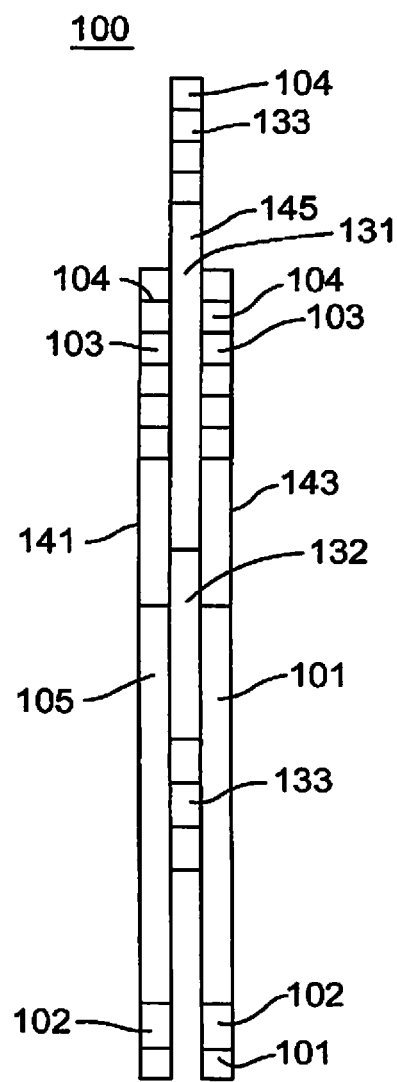
FIG. 4 illustrates a top view of the center member, the first mirror side member and the second mirror side member of the present invention.

FIG. 4 illustrates the center member 145, the first mirror side member 141 and the second mirror side member 143 of the detachable foot rest 100 and illustrates that the center member 145 may be offset/extended with respect to the first mirror side member 141 and the second mirror side member 143.

FIG. 4 illustrates the first inclined top surface 101, the second inclined top surface 103, the curved top surface 102 and the teeth 104 of the first mirror side member 141.

FIG. 4 additionally illustrates the center member 145 which may include a fourth inclined top surface 132 which may be connected to the third inclined top surface 131 at an acute angle, and the fourth inclined top surface 132 may include teeth 133 on an end of the fourth inclined top surface 132.

FIG. 4 illustrates the first inclined top surface 101, the second inclined top surface 103, the curved top surface 102 and the teeth 104 of the second mirror side member 143.

Figure 5:
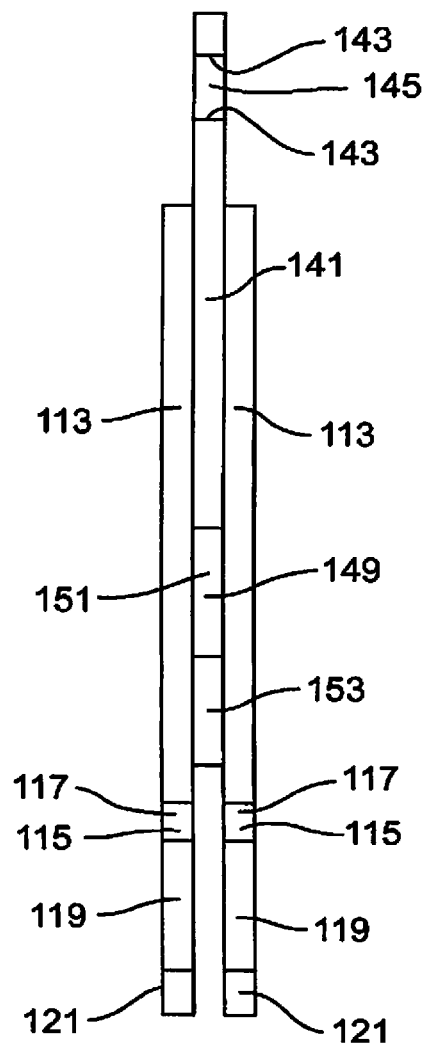
FIG. 5 illustrates a bottom view of the center member, the first mirror side member and the second mirror side member of the present invention.

FIG. 5 illustrates a bottom view of the first mirror side member 141, the second mirror side member 143 and the center member 145.

The first concave bottom surface 113 which may be concave is connected to a curved bottom surface 115 which may define a depression 117 and which may be connected to a second concave bottom surface 119 which may be concave shaped. The second concave bottom surface 119 may be connected to the planar bottom surface 121.

FIG. 5 illustrates the concave bottom surface 141 which may be connected to a first curved bottom surface 143 which may define a first depression 145 and may form a hook surface 147 to grasp the foot rest of the mounted foot rest of the dirtbike.

FIG. 5 additionally illustrates the concave bottom surface 141 being connected to a second curved bottom surface 149 which may define a depression 151 to engage the permanent foot rest of the dirtbike. The second curved bottom surface 141 may be connected to a third bottom surface 153.

FIG. 6 illustrates a perspective view of the first mirror side member 141, the center member 145, the second mirror side member 143 and the permanently attached foot rest 161 which may be permanently attached to the dirtbike.

The depression 104 of the first mirror side member 141 and the depression 104 of the second mirror side member 143 cooperate to engage the leading section of the permanently connected foot rest 161.

The depression 117 which may be opposed to the depression 104 of the first mirror side member 141, the depression 151 of the center member 145 and the depression 117 of the second mirror side member 143 cooperate to engage the trailing section 603 of the permanently connected foot rest 161.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A detachable foot rest for a motorcycle to detachably connect to a permanently connected foot rest, comprising:
   a first mirror side member;
   a center member connected to the first mirror side member;
   a second mirror side member connected to the center member;
   wherein the first mirror side member includes a first depression and the second mirror side member includes a mirror first depression;
   wherein the first depression and the mirror first depression cooperate with a leading section of the permanently connected foot rest;
   wherein the center member extends beyond the first mirror side member and the second mirror side member.

2. A detachable foot rest for a motorcycle to detachably connect to a permanently connected foot rest as in claim 1, wherein the first mirror side member includes a second depression and the second mirror side member includes a mirrored second depression and the center member includes a third depression.

3. A detachable foot rest for a motorcycle to detachably connect to a permanently connected foot rest as in claim 2, wherein the second depression, the mirror second depression and the third depression are opposed to the first depression and the first mirror depression and engage a trailing section of the permanently connected foot rest.

* * * * *